United States Patent [19]

Wassell

[11] Patent Number: 4,779,852
[45] Date of Patent: Oct. 25, 1988

[54] VIBRATION ISOLATOR AND SHOCK ABSORBER DEVICE WITH CONICAL DISC SPRINGS

[75] Inventor: Mark E. Wassell, Glastonbury, Conn.

[73] Assignee: Teleco Oilfield Services Inc., Meriden, Conn.

[21] Appl. No.: 86,359

[22] Filed: Aug. 17, 1987

[51] Int. Cl.⁴ .............................................. F16F 9/18
[52] U.S. Cl. .................................. 267/125; 175/321; 267/219; 267/137; 267/141.2; 267/141.1; 464/20; 166/319
[58] Field of Search ... 267/125, 137, 136, 140.1–141.7, 267/219, 292, 294, 280; 175/321, 296, 293, 322, 306; 464/20, 18, 23, 163; 166/113, 316, 188–191, 319–329; 188/322.5

[56] References Cited

U.S. PATENT DOCUMENTS

| | | | |
|---|---|---|---|
| 3,782,464 | 1/1974 | Quichaud et al. | 166/319 |
| 3,827,491 | 8/1974 | Dinning | 166/319 X |
| 4,171,025 | 10/1979 | Bassinger | 267/125 X |
| 4,387,885 | 6/1983 | Bishop et al. | 267/125 |
| 4,439,167 | 3/1984 | Bishop et al. | 267/125 X |
| 4,630,809 | 12/1986 | Duckworth | 267/141.1 |
| 4,732,211 | 3/1988 | Haugen et al. | 166/321 |

Primary Examiner—Douglas C. Butler
Attorney, Agent, or Firm—Fishman, Dionne & Cantor

[57] ABSTRACT

A vibration isolator and shock absorber system which provides excellent protection to sensors against the deleterious effects of shock and vibration even under severe drilling conditions is presented. The vibration isolator and shock absorber system is enclosed within an outer cage and an inner yoke. The cage is attached to the drill collar which takes the full impact of the shock and vibration due to drilling. The yoke supports the sensor. Conical disc springs (e.g. Belleville springs) or the like are stacked between the yoke and the cage; and are supported by pairs of upper and lower support rings. These rings fit together to compress the springs and to allow for axial displacement as well as providing damping. The pairs of support rings are supported, in turn, between upper and lower elastomeric isolator rings. The upper elastomeric isolator ring is keyed to the yoke and the cage. Fluid is allowed to move through the system via orifices in both the elastomeric isolators and the pairs of support rings. The size of the orifices in the support rings control the amount of damping within the system. The vibration isolator and shock absorber system of the present invention will dampen severe loads in the axial, lateral and torsional directions. The system utilizes the drilling fluid as the damping medium for viscous damping (e.g. forcing fluid through orifices in the support rings).

27 Claims, 7 Drawing Sheets

VIBRATION ISOLATOR AND SHOCK ABSORBER DEVICE WITH CONICAL DISC SPRINGS

BACKGROUND OF THE INVENTION

This invention relates to the field of vibration isolation and shock absorption. More particularly, this invention relates to the field of vibration isolation and shock absorption in borehole telemetry wherein data relating to borehole parameters is gathered by sensing instruments located downhole in the drillstring and is transmitted to the surface via pressure pulses created in the drilling mud. The mud pulse telemetry apparatus and associated sensor apparatus are high precision equipment which are installed in a special section of the drillstring close to the drill bit or mud motor. This precision equipment must be protected from the shock and vibration caused by drilling operations.

The basic concept of mud pulse telemetry for transmitting borehole data from the bottom of a well to the surface has been known for some time. U.S. Pat. Nos. 4,021,774, 4,013,945 and 3,982,431 all of which are owned by the assignee of the present invention and which are incorporated herein by reference in their entirety show various aspects of a mud pulse telemetry system. Mounting and shock absorber assemblies intended for use in mud pulse telemetry systems are shown in U.S. Pat. Nos. 3,714,831, 3,782,464, 4,265,305 and 4,630,809, the latter two of which are assigned to the assignee hereof and all of which are incorporated herein by reference in their entirety.

The mounting and shock absorber assembly of previously mentioned U.S. Pat. No. 4,265,305 has been in commercial use in the mud pulse telemetry system operated by the assignee hereof. While the mounting and shock absorber assembly of that patent and the others referred to above are adequate for their intended purposes, they have certain drawbacks. For example, the systems of U.S. Pat. Nos. 3,714,831 and 3,782,464 require that the drill collar in which they are mounted be in two pieces in order to have access to the shock absorber elements for assembly. That requirement for a two piece drill collar poses several disadvantages, discussed in more detail in U.S. Pat. No. 4,265,305. While the system disclosed in U.S. Pat. No. 4,265,305 eliminates the problem of the requirement for a two piece drill collar, that system (and those of U.S. Pat. Nos. 3,714,831 and 3,782,469) requires two different kinds of elements, and it experiences a discontinuity in its load absorption characteristics. The system of U.S. Pat. No. 4,265,305 is made up of essentially two elements: a series of elastomeric rings which function as springs or isolators, and a bumper structure. The shock absorber structure of U.S. Pat. No. 4,265,305 usually operates over a range in which both the elastomeric springs or isolators and the bumpers are operative. As a result, and because of the different spring rate characteristics, a potentially serious discontinuity in load bearing characteristics occurs at the transition point between operation of the elastomeric springs or isolators and the bumper structures. This discontinuity is undesirable.

U.S. Pat. No. 4,630,809 presents an improved vibration isolator and shock absorber device which both overcomes the problem discussed above and has other advantages. In U.S. Pat. No. 4,630,809, elastomeric vibration isolation elements interact with reaction elements to form differential springs, i.e., springs in which the deflection and load characteristics change with load. The load characteristics change from shear at low loading to compression at high loading, with a smooth transition between shear and compression. This eliminates the discontinuity encountered in the prior art devices discussed above. Also, the apparatus of U.S. Pat. No. 4,630,809 eliminates the need for a separate bumper structure, since the elastomeric isolation elements and the reaction elements combine to form bumper structures at the extreme end of the operating range.

While suitable for their intended purposes, in extreme or severe drilling conditions, sensor failures attributed to shock and vibration continue to occur despite rubber isolator and/or bumper suspension units such as those disclosed in U.S. Pat. Nos. 4,265,305 and 4,630,809. Sensors which have been particularly prone to failure attributed to shock and vibration include magnatometers and accelerometers. The most common failure is the accelerometer crystal reed.

Still other problems and deficiencies of rubber suspension systems of the type described above is that the force of the drilling fluid deflects the suspension against the bumpers. Also, over time, the rubber will undergo creep resulting in a permanent set up against the bumpers.

SUMMARY OF THE INVENTION

The above discussed deficiencies of the prior art are overcome or alleviated by the vibration isolator and shock absorber system of the present invention which provides excellent protection to sensors against the deleterious effects of shock and vibration even under severe drilling conditions.

In accordance with the present invention, the vibration isolator and shock absorber system is enclosed within an outer cage and an inner yoke. The cage is attached to the drill collar which takes the full impact of the shock and vibration due to drilling. The yoke supports the sensor. Spring elements, preferably conical disc springs e.g. Belleville springs) or the like are stacked between the yoke and the cage; and are supported by pairs of upper and lower support rings. These rings fit together to compress the springs and to allow for axial displacement as well as providing damping. The pairs of support rings are supported, in turn, between upper and lower elastomeric isolator rings. The upper elastomeric isolator ring is keyed to the yoke and the cage. Fluid is allowed to move through the system via orifices in both the elastomeric isolators and the pair of support rings. The size of the orifices in the support rings control the amount of damping within the system.

The vibration isolator and shock absorber system of the present invention will dampen severe loads in the axial, lateral and torsional directions. The system utilizes the drilling fluid as the damping medium for viscous damping (e.g. forcing fluid through orifices in the support rings at or near the resonant frequency). Additional damping is supplied by flexing of the Belleville disc springs, which causes fluid movement, and friction and material damping of the springs. Radial (lateral) and axial damping is provided by the rubber isolator rings while torsional damping is provided by locking the upper isolator ring to the yoke and cage.

While the vibration isolator and shock absorber system of the present invention is being shown and described in the environment of a suspension in a mud pulse telemetry system, it will be understood that the system may be employed in other structures and environments. The system can readily be adapted as a suspension system for heavy or light weight devices, and to provide for a greater or lesser range of travel. Furthermore, the characteristics of this system can be tailored to provide desired characteristics by changing the number of Belleville springs and rubber isolator rings.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
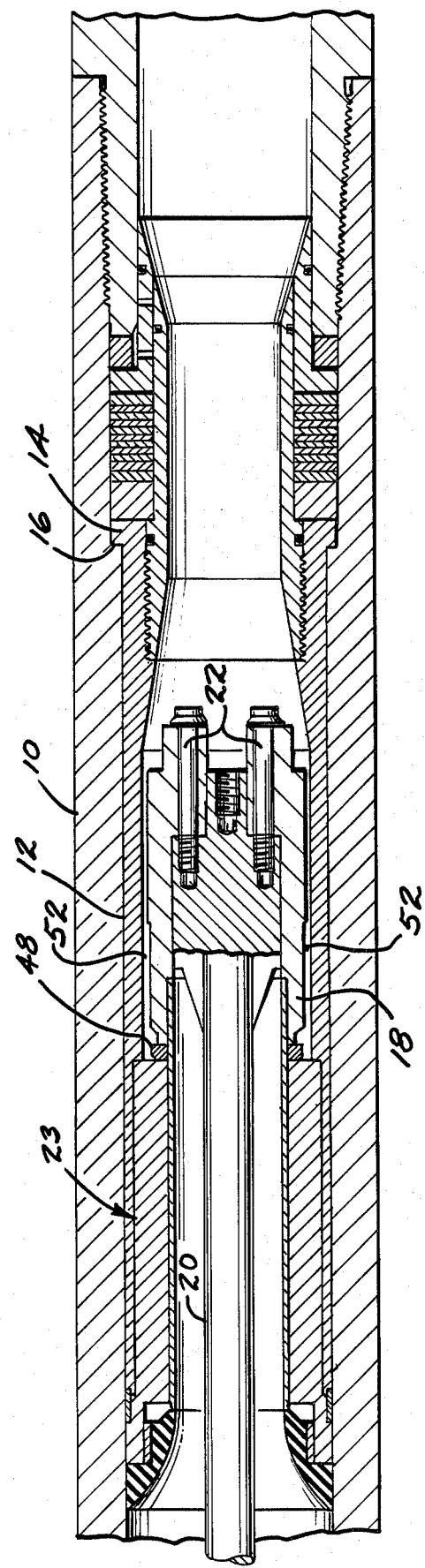
FIG. 1 shows a detailed cross section elevation view of the improved vibration isolator and shock absorber of the present invention.
Figure 1A:
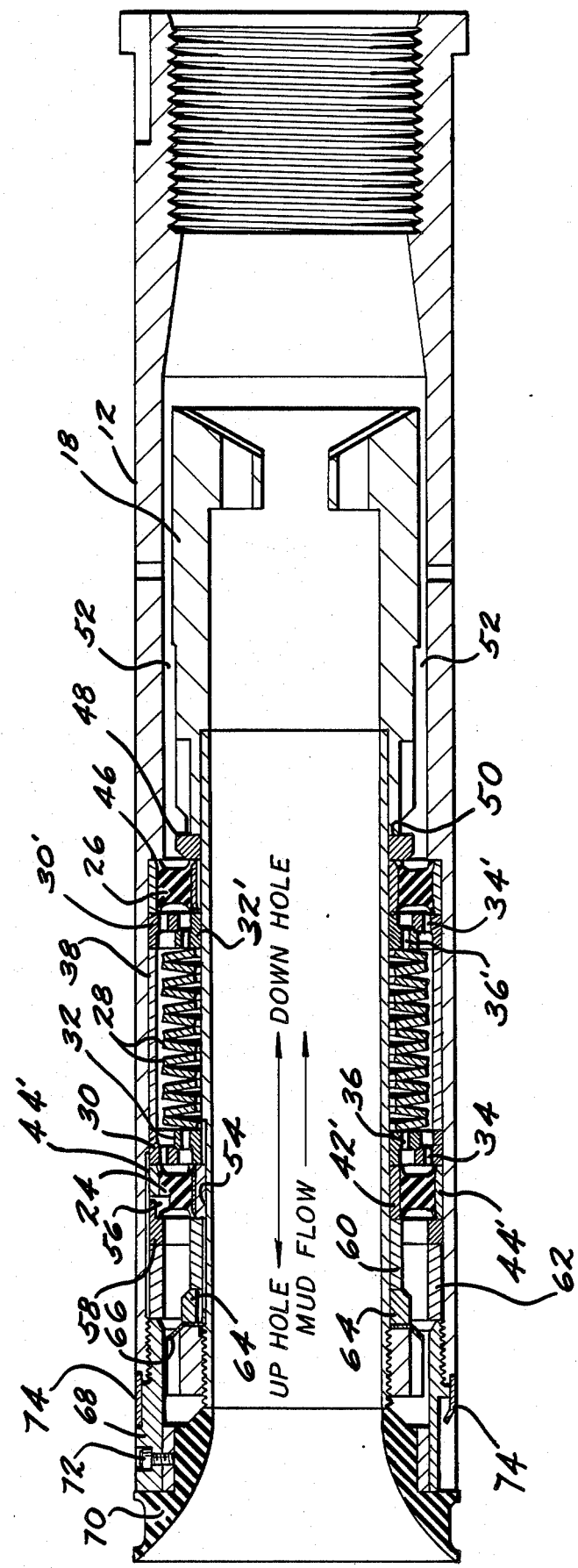
FIG. 1A is on enlarged cross section elevation view of a portion of the vibration isolator and shock absorber of FIG. 1.

FIGS. 1 and 1A show sectional elevation views of the vibration isolator and shock absorber system of the present invention for use in a mud pulse telemetry apparatus and system. To understand the environment in which the structure of FIG. 1 would be located, FIG. 1 corresponds, generally, to FIG. 1C of U.S. Pat. No. 4,265,305 and FIG. 1A corresponds, generally, to FIG. 3 of U.S. Pat. No. 4,265,305. That is, FIGS. 1 and 1A show a vibration isolator and shock absorber assembly positioned at the lower end of a mud pulse transmitter system within a drill collar 10.

The vibration isolation and shock absorbtion system of the present invention constitutes a suspension system for the sensor apparatus which includes a mud pulse valve (not shown). The sensor, and its operation, is more fully described in some of the prior art patents identified above.

The present invention includes an outer cylinder or cage 12 which is rigidly connected to drill string 10 via split ring 14 which sits in a recess 16 in drill collar 10 and is locked to the upper end of cylinder 12. The suspension system also includes an inner cylinder or yoke 18. Inner cylinder 18 provides the bore through which the drilling mud flows in the downhole direction. Inner cylinder 18 is rigidly bolted and thus locked to mounting shaft 20 via bolts 22. Shaft 20 corresponds, generally, to shaft 222 of U.S. Pat. No. 4,265,305. Shaft 20 extends to and is connected to the sensor housing (not shown).

The outer and inner cylinders 12 and 18 are mechanically connected together by an assembly (identified generally at 23 in FIG. 1 and shown in detail in FIG. 1A) comprising an upper elastomeric isolator ring 24 and a lower elastomeric isolator ring 26 sandwiching therebetween a plurality of stacked spring elements, preferably Belleville conical disc spring elements 28. Between spring elements 28 and upper isolator ring 24 is an outer support ring 30 supported on outer cylinder 12 and an inner support ring 32 supported on inner cylinder 18. Flow openings 34 and 36 are provided respectively through support rings 30 and 32 to develop viscous damping as the fluid is worked. Similarly, an outer support ring 30' and an inner support ring 32' with flow openings 34' and 36' respectively, are provided between spring elements 28 and lower isolator ring 26. Spring elements 28 are annularly mounted on inner cylinder 18. A disc spring spacer sleeve 38 surrounds spring elements 28 and is supported between outer support rings 30 and 30'.

Figure 2:
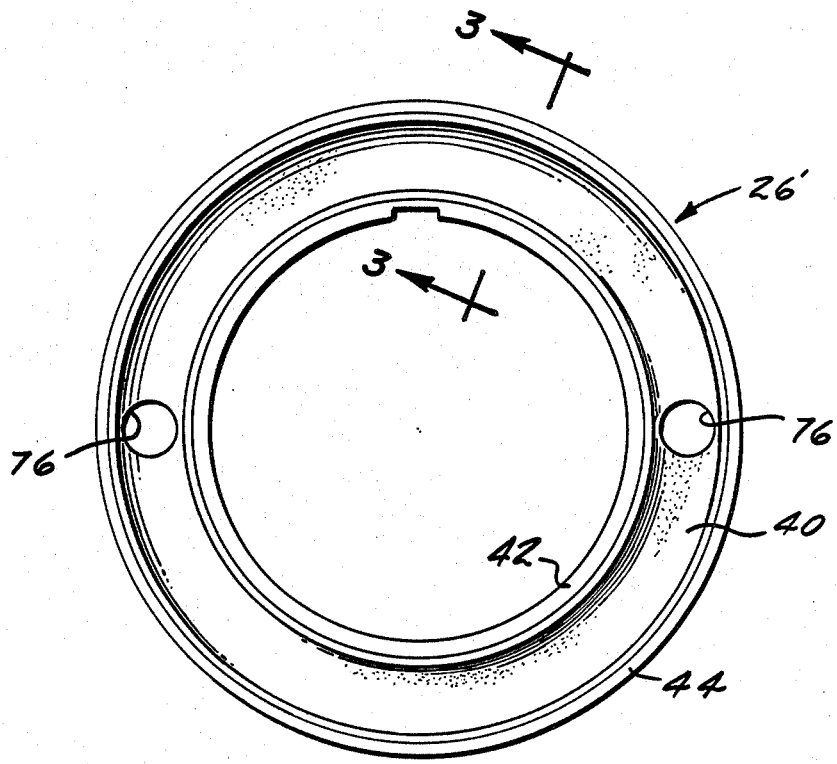
FIG. 2 is a plan view of an elastomeric isolator ring used in the vibration isolator and shock absorber system of FIG. 1.
Figure 3:
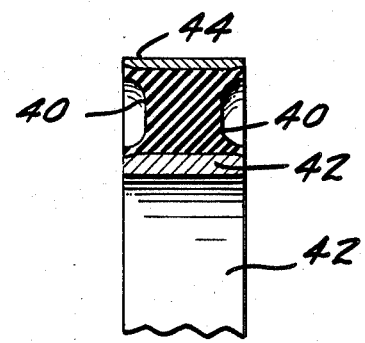
FIG. 3 is a cross sectional elevation view along the line 3—3 of FIG. 2.

Referring simultaneously to FIGS. 1–3, lower isolator ring 26 comprises an annular ring of elastomeric material with a pair of facing U-shaped recesses 40 along the sidewalls thereof. The inner circumference of ring 26 includes an inner metal ring 42 attached thereto; and the outer circumference of ring 26 includes an outer ring 44 attached thereto. Lower isolator ring 26 is supported on its downhole side by both cylinders 12 and 18. Ring 26 is supported in outer cylinder 12 by a shoulder 46 and is supported in inner cylinder 18 by a support ring 48 supported by an annular notch 50 in inner cylinder 18. , It will be appreciated that inner and outer cylinders 12 and 18 are spaced from each other by lower isolator ring 26 to provide Passageway 52 for passage of drilling fluid. Referring again to FIGS. 2 and 3, a rubber isolator ring 26' includes a plurality of openings 76 therethrough for the passage of drllling fluid.

Upper isolator ring 24 is locked to both inner cylinder 18 and outer cylinder 12. A key 54 rigidly connects isolator ring 24 to yoke 18 while a notch 56 interacts with ring 24 to lock the ring to cage 12. Upper isolator ring 24 similarly includes inner and outer metal rings 42' and 44' in the same manner as lower isolator ring 26. Continuing up the drill string, an anti-rotation ring 58 is provided along outer cylinder 12 to prevent rotation of isolator ring 24. Next, upper spacer sleeves 60 and 62 are provided to the respective inner and outer cylinders. Upper inner spacer sleeve 60 is positioned between upper isolator element 24 and a sensor suspension spacer 64 and a lockwasher 66. Upper outer spacer sleeve 62 is positioned between anti-rotation rig 58 and a nut-vibration isolator 68.

The upper portion of the vibration and shock absorber of the present invention further includes an elastomeric sand guard assembly 70 which is locked to the nut-vibration isolator 68 by a screw 72. Nut vibration isolator 68 is keyed to outer cylinder 12 by a locking ring 74.

Figure 4:
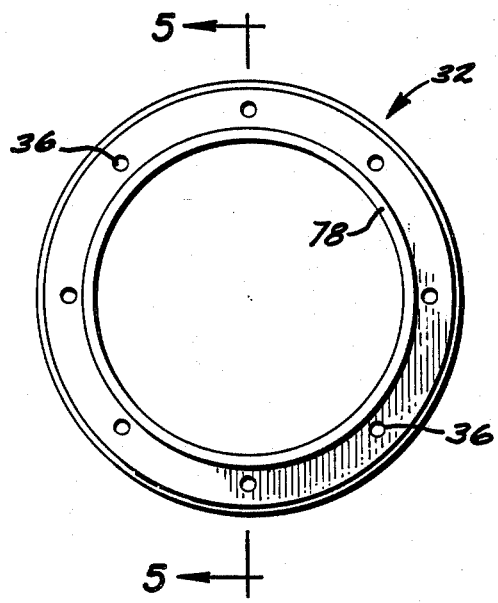
FIG. 4 is a plan view of a inner support ring used in the vibration isolator and shock absorber of FIG. 1.
Figure 5:
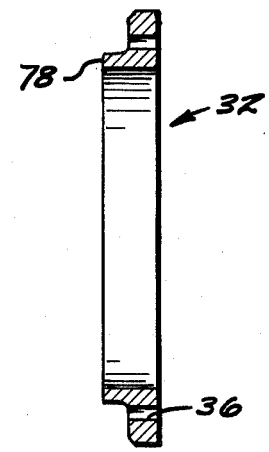
FIG. 5 is a cross-sectional elevation view along the line 5—5 of FIG. 4.
Figures 6, 7:
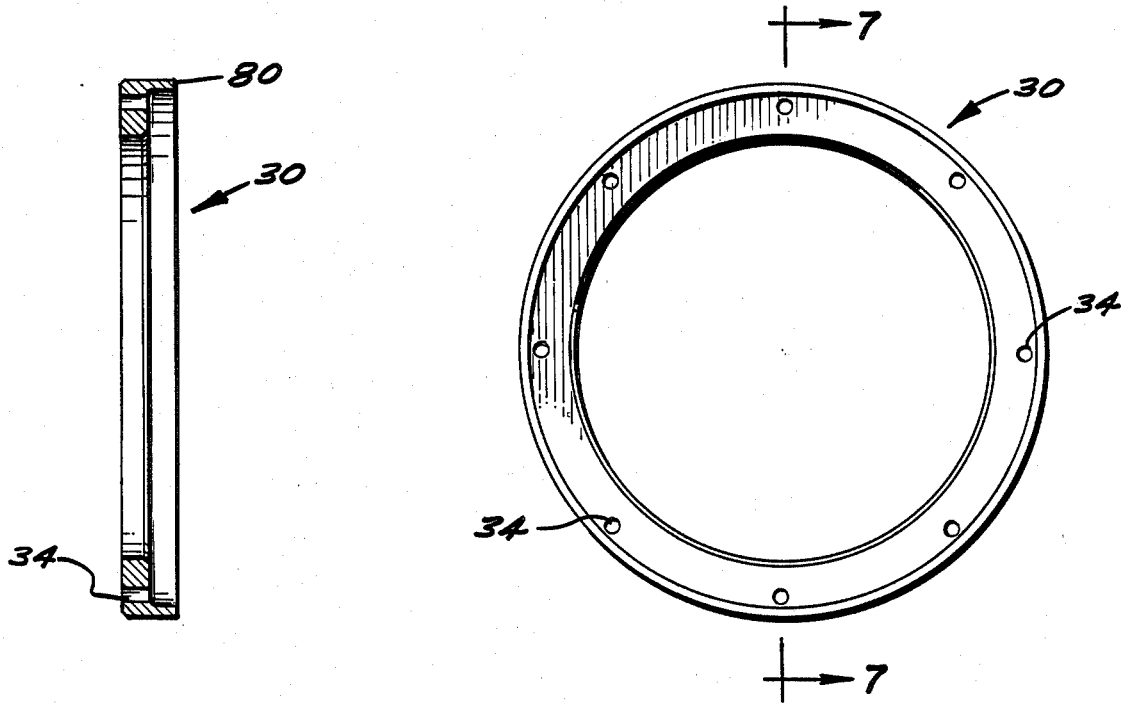
FIG. 6 is a plan view of an outer support ring used in the vibration isolator and shock absorber of FIG. 1.
FIG. 7 is a cross-sectional elevation view along the line 7—7 of FIG. 6.

Referring now to FIGS. 4–7, an inner support 30 is shown in FIGS. 4 and 5, and an outer support 32 is shown in FIGS. 6 and 7. Inner support ring 30 comprises an annular ring having an extending flange member 78 along its inner circumference which is supported by inner cylinder 18. Outer support ring 32 also comprises an annular ring having an extended flange member 80 along its outer circumference. Flow openings or passages 34 and 36 are radially arranged through each ring 30 and 32. The number of passages 34 and 36 are important in determining the amount of damping provided by the system. As shown in FIG. 1A, inner and outer support rings 30 and 32 are placed in abutting relationship and are allowed to move laterally with respect to each other. Viscous damping occurs as follows: It will be appreciated that in an undeflected condition, a specific volume exists between the pairs of upper and lower support rings. When the drill collar is subjected to shock, the conical spring stack-up deflects causing the volume between the support rings to change and forcing fluid to move through the orifices 34, 36 in the rings creating viscous damping. This important feature of the present invention which acts to provide viscous damping at or near the resonant frequency of the suspension is discussed in more detail hereinafter with reference to FIG. 6.

The number of conical disc or similar springs 28 may vary depending upon the size of the tool and other factors. The conical disc springs are stacked one on top of the other with the insides of the cones facing each other in series as shown in FIG. 1A. It will be appreciated that while FIG. 1A shows seven pairs of disc springs in facing relation (actually 14 individual disc springs), any number of springs may be used as long as adequate suspension and damping is provided thereby.

To resolve the sensor failures often present in severe drilling conditions, the novel vibration and shock absorber system of the present invention is designed to be softer and more reliable than the rubber suspension systems of the prior art. A significant difference between the configurations of the rubber systems and the present invention is that the rubber systems have the springs in parallel, while the present invention has the springs in series. The rubber suspension has the inherent problems of creep, debonding of the rubber from the support rings and erosion. To eliminate these problems, in the present invention, conical disc springs (e.g., Belleville springs) replace the rubber isolators. The Belleville spring material is high strength, has low magnetic properties, and has good corrosion resistance in the harsh downhole environment.

In the following test comparisons, a rubber suspension for a 7¾ tool has been used which has four isolators for the thirty foot collar and five isolators for the thirty-five foot collar. The spring rate for the isolators which act in parallel is 1,500 to 2,500 lbs/in, each resulting in a 10,000 lb/in. spring rate for the thirty foot collar and a 8000 lb/in. spring rate for the thirty-five foot collar. However, with the sensor load of 270 lbs. and the drag force of the mud on the sensor and suspension (up to an additional 70 lbs.) the bumpers become active, significantly increasing the spring rate of the rubber suspension. The result is a higher than anticipated spring rate for the rubber suspension and the elimination of any viscous damping. This result increases the transmitted shock to the sensor.

The shock absorber of the present invention selected for the comparative testing is designed for the same spring rate as the rubber suspension without active bumpers which results in a softer suspension. The present invention also benefits from viscous and friction damping further reducing the transmitted shock to the sensor. The combined result of the reduced spring rate and the viscous damping yields a predicted reduction in response of two-thirds (assuming twenty-five percent of critical damping).

The transmitted response to the sensor is a function of the spring rate and the system damping. The lower the spring rate, the softer the suspension. Damping can additionally reduce the response. However, too much damping can increase the response by making the suspension spring stiffness to hard. The optimal damping rate is twenty-five percent of critical damping. With the rubber suspension of the prior art, damping is supplied from fluid movement and the material damping of the rubber itself. The damping levels are relatively low due to the bumpers bottoming out resulting in little movement of the fluid within the suspension. This leaves only the material damping of the bumper. Increasing the bumper gap increases the amount of fluid which is moved by flexing the suspension and provides increased damping resulting in a lower sensor response. The present invention has been designed to include damping by moving fluid through the support rings as the suspension flexes, moving the fluid about the Belleville springs, friction damping of the Belleville springs, and material damping. As the suspension volume changes, fluid is forced through the support rings holes 34, 36 supplying most of the damping of this system. These holes can be increased or decreased to obtain optimum damping as will be discussed in more detail hereinafter.

TESTING

1. AXIAL TESTING—7¾ Inch Suspension

The suspensions were tested for axial shock response by drop testing them from various heights. Shock levels at the cage (outer cylinder 12) and at the sensor were recorded. The various suspensions tested are:
  1. Rubber suspension (five isolator)—dry.
  2. Rubber suspension with increased bumper gaps—dry.
  3. Rubber suspension with increased bumper gaps—water filled.
  4. Rubber suspension with decreased bumper gaps—dry.
  5. Rubber suspension with decreased bumper gaps—water filled.
  6. Present invention—dry.

TEST SETUP

Shock loads were developed on the suspension - sensor assembly by dropping the assembly from various heights. The suspensions were built-up and a 270 lb. mass attached at the sensor support rod to simulate the sensor weight. An acclerometer attached to the cage cap recorded input shock levels. A second accelerometer placed on the mass recorded the isolated sensor response. The suspension was dropped in a support tube at various heights and developed shock loads to 100 g's. The suspension was lifted to given heights by means of an over head crane. A wire attachment was cut to release the suspension. Drop heights ranged from 1 to 12 inches. Drop heights over 12 inches yielded the yoke thread. Tests were done both dry and water filled to determine the damping effect of the mud on the suspensions. The suspension was dropped on a thin rubber pad to absorb some of the energy to eliminate noise levels which were interfering with the test data. Test data is based on an average of three drops at each height.

TEST RESULTS

Figure 8:
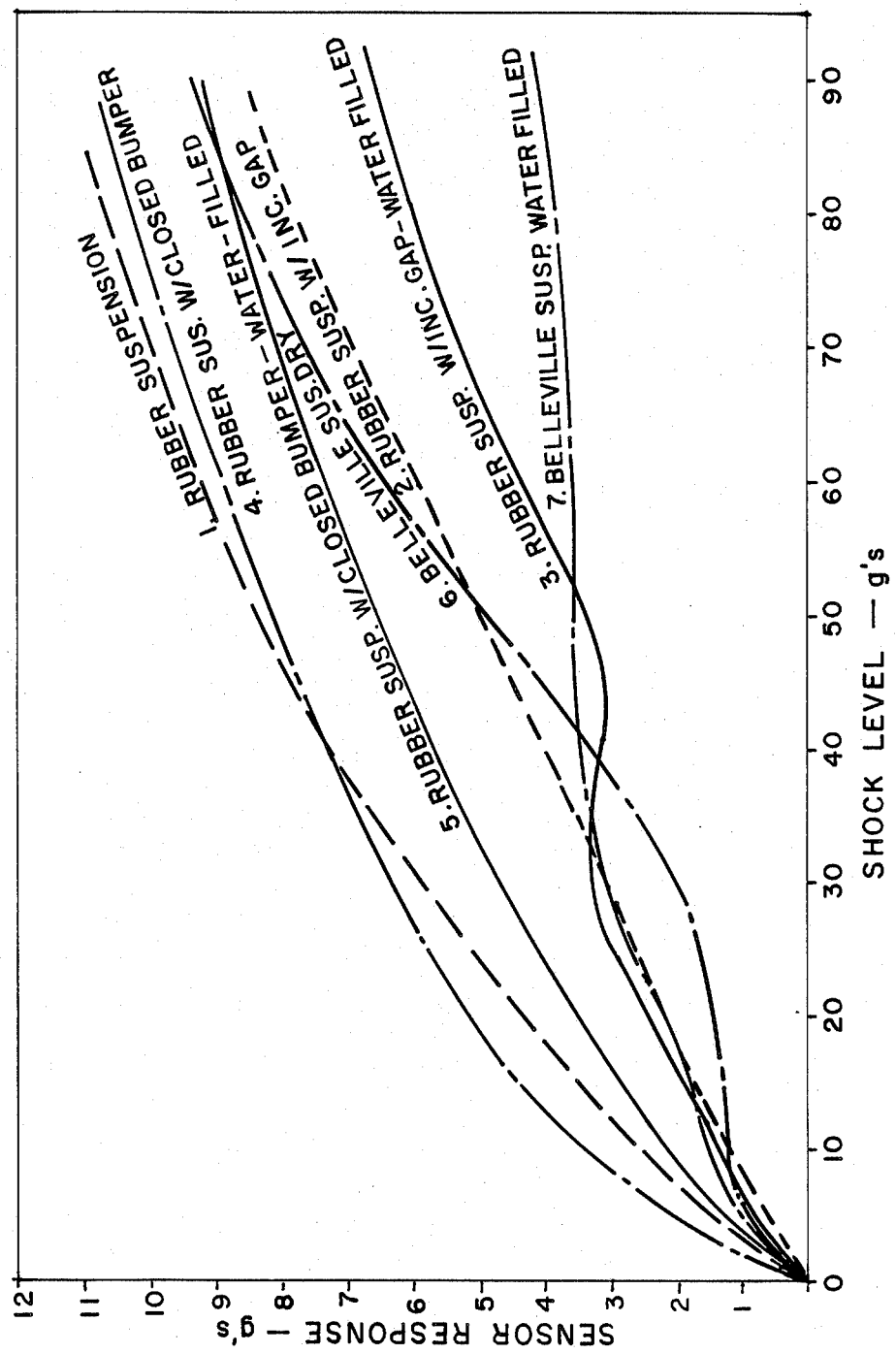
FIG. 8 is a graph showing axial sensor response for 7¾ inch tested suspensions.

The suspensions were tested with drop heights from 1, 3, 5, 7, 9 and 12 inches to develop the impact levels. All suspensions significantly reduced shock response to the sensor. The assembly of the present invention water filled was better or equal to all suspensions at all shock levels. The rubber suspension—water filled with increased bumper gaps reduced response equal to the present invention design at low to medium impacts, but has increased response at higher impact levels. It is thought that the bumpers become active at these higher levels. The standard rubber suspension and the rubber suspension with closed bumpers responded identically concluding that the bumpers for the standard design are active at all shock levels. The results are shown in FIG. 8.

Conclusions which can be reached from the foregoing testing include:

1. The present invention, water filled, reduces the transmitted sensor shock by fifty-three percent compared to the rubber suspension—water filled.

2. The rubber suspension of the prior art is found to operate with the suspension deflected against the bumpers which results in the spring rate of the suspension being controlled by the bumpers. The damping effect for this suspension when water filled is minimal.

3. The rubber suspension, dry, showed significant improvement with increased bumper gaps reducing the transmitted shock to the sensor by thirty-seven percent. Water filling the suspension to provide viscous damping decreased the response by fifty-eight percent. The increased bumper gap would, however, result in a permanent set of the rubber isolator due to creep, eventually bottoming out on the bumpers resulting in increased transmitted shock and isolator bond failures.

4. Torsional response using an assembly in accordance with the present invention will be reduced by a factor of two compared to the rubber suspension.

2. AXIAL TESTING—$6\frac{3}{4}$ Inch Suspension

The $6\frac{3}{4}$ vibration isolator and shock absorber of the present invention was tested along with a prior art $6\frac{3}{4}$ Rubber Lower Suspension. The test procedure was the same as for the $7\frac{3}{4}$ Lower Suspension Tests described above. The built-up suspensions were dropped from heights ranging from 1 inch to 12 inches to develop the impact loads. The suspensions were tested with and without fluid to determine the damping of the fluid.

TEST RESULTS

Figure 9:
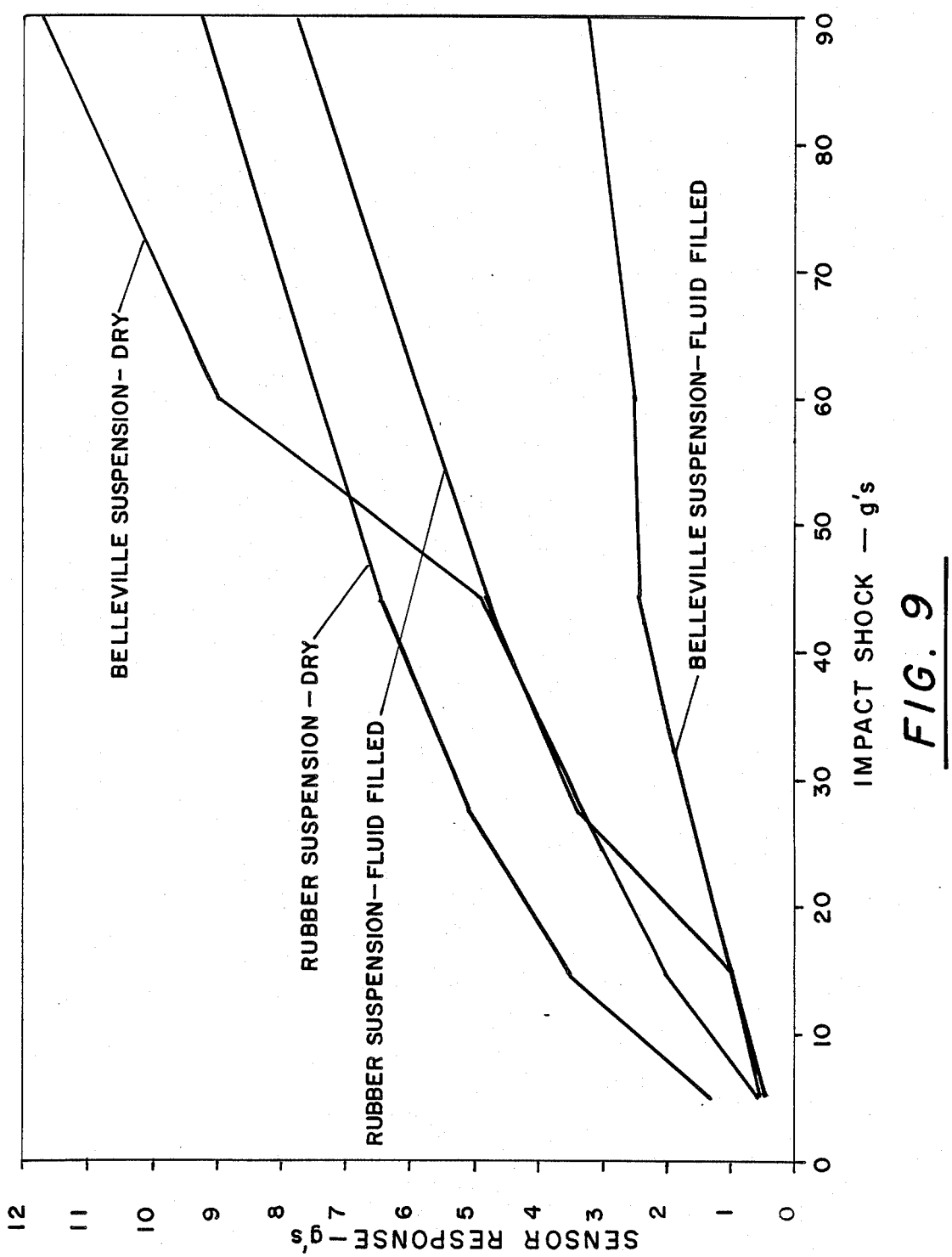
FIG. 9 is a graph showing axial sensor response for 6¾ inch tested suspensions.
Figure 10:
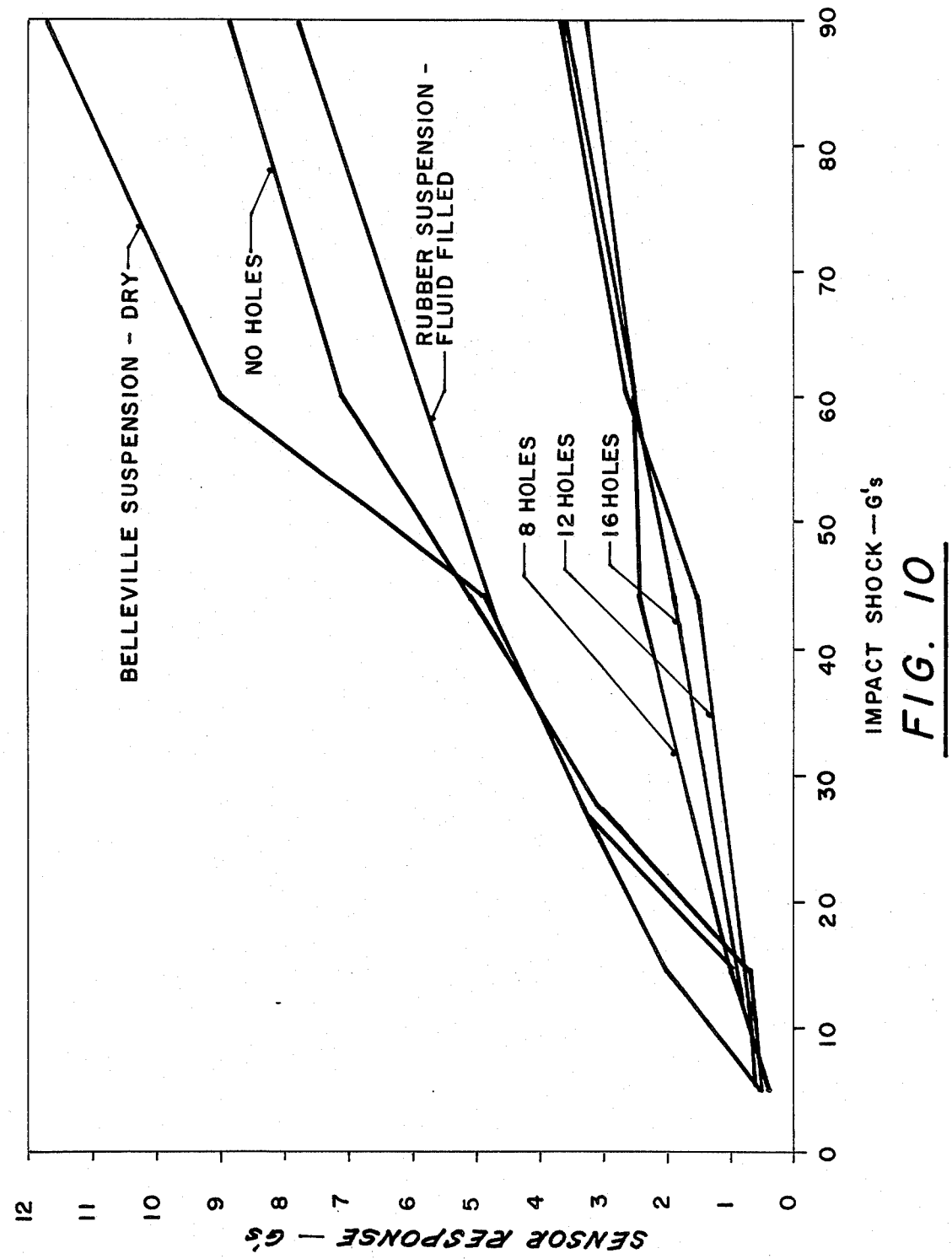
FIG. 10 is a graph showing sensor response with respect to varying the number of isolator support ring holes.

When tested without fluid, both the present invention and the rubber suspension of the prior art had similar responses. At lower shock levels, the present invention transmitted lower response, however at higher shock levels the rubber suspension transmitted lower response. With the assemblies water filled, the present invention showed great improvement reducing the transmitted response seventy percent. The rubber suspensions of the prior art had much less benefit with only a fifteen percent improvement. The results for the $6\frac{3}{4}$ suspensions give approximately the same results as for the $7\frac{3}{4}$ testing. The results are graphically shown in FIG. 9.

Conclusions which can be drawn from this testing include:

1. The present invention reduces the shock to the sensor by fifty-nine percent compared to the prior art rubber suspension when fluid filled.

2. Fluid damping decreased the transmitted shock by seventy percent for the suspension of the present invention.

3. DAMPING TEST—VARYING THE NUMBER OF ISOLATOR SUPPORT RING HOLES

To optimize the viscous damping of the vibration isolator and shock absorber of the present invention, tests were performed with $6\frac{3}{4}$ suspensions with varying number of support ring holes. The support rings have an array of $\frac{1}{8}$ inch holes through which the fluid moves developing the viscous damping of the system. Tests were conducted with:

a. Dry
b. Fluid filled with no holes.
c. Fluid filled with eight holes (preferred configuration).
d. Fluid filled with twelve holes.
e. Fluid filled with sixteen holes.

Viscous damping at or near the resonant frequency of the suspension is developed by forcing fluid to move through the support ring holes. The size and number of holes effects the amount of damping present in the system. With too few holes the suspension will become stiff, while too many holes will not provide much damping. Referring to FIG. 6, with the holes in the suspension eliminated, the transmitted response decreased by twenty-five percent compared to a dry suspension. The improvement is due to the fluid being able to move around the components of the suspension. However, the performance is only equal to the performance of the prior art rubber suspension. The transmitted response for eight, twelve and sixteen holes is significantly better than a suspension without holes. Compared to a suspension without fluid, the transmitted shock is reduced seventy percent, and compared to the suspension fluid filled without holes the performance improves sixty percent.

Conclusions which can be reached from the above testing include:

1. The support ring holes significantly improve the performance of the suspension.

2. Without the holes, very little viscous damping is present. The transmitted response is reduced twenty-five percent compared to the dry suspension.

3. The amount of viscous damping provided by eight, twelve and sixteen holes is almost identical. The transmitted response is reduced seventy percent compared to the dry suspension, and sixty percent compared to the suspension without the holes.

It will be appreciated that while the vibration isolator and shock absorber system of the present invention has been described in association with a lower suspension system for downhole sensors of the type described in U.S. Pat. No. 4,265,305, the present invention may also be utilized as the upper suspension described in FIG. 2 of U.S. Pat. No. 4,265,305.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A vibration isolator and shock absorber device having a longitudinal axis and including:
    an inner support member;
    an outer support member spaced from and surrounding said inner support member;

at least one first elastomeric isolator ring between said inner and outer support members;

at least one second elastomeric isolator ring between said inner and outer support members, said second isolator ring being axially spaced from said first isolator ring;

at least one opening through each of said first and second isolator rings to permit the passage of fluid therethrough; and a plurality of stacked spring elements between said first and second isolator rings wherein each of said spring elements comprises a conical disc spring.

2. The device of claim 1 wherein:
said spring elements are mounted on said inner support member.

3. The device of claim 1 wherein each of said conical disc springs have an interior surface and an exterior surface and wherein:
said conical disc springs are stacked such that adjacent pairs of springs have their interior surfaces in facing relationship.

4. The device of claim 1 including:
first ring support means between said first elastomeric isolator ring and said stacked spring elements;
second ring support means between said second elastomeric isolator ring and said stacked spring elements; and
each of said first and second ring support means including at least one flow opening therein to permit the passage of fluid therethrough.

5. The device of claim 4 wherein said first ring support means comprises:
a first support ring mounted on said inner support member and having at least one flow hole therein;
a second support ring mounted on said outer support member and having at least one flow hole therein; and
said first and second support rings being in abutting relationship.

6. The device of claim 5 wherein said second ring support means comprises:
a third support ring mounted on said inner support member and having at least one flow hole therein;
a fourth support ring mounted on said outer support member and having at least one flow hole therein; and
said third and fourth support rings being in abutting relationship.

7. The device of claim 4 wherein said second ring support means comprises:
a third support ring mounted on said inner support member and having at least one flow hole therein;
a fourth support ring mounted on said outer support member and having at least one flow hole therein; and
said third and fourth support rings being in abutting relationship.

8. The device of claim 4 wherein:
said spring elements are mounted on said inner support member.

9. The device of claim 8 including:
sleeve means mounted along said outer support member between said first and second ring support means.

10. The device of claim 4 including:
a plurality of spaced flow holes through each of said first and second ring support means.

11. The device of claim 10 including:
at least eight spaced flow holes through each of said first and second ring isolator support means.

12. The device of claim 1 wherein:
at least one of said first and second elastomeric isolator rings is rigidly connected to both said inner and outer support members.

13. The device of claim 1 wherein:
each of said first and second elastomeric isolator rings have opposed sidewalls and including:
annular recesses along each of said sidewalls.

14. The device of claim 1 wherein each of said first and second elastomeric isolator rings have an inner and outer cylindrical surface and including:
a first metal ring on said inner cylindrical surface; and
a second metal ring on said outer cylindrical surface.

15. A vibration isolator and shock absorber device having a longitudinal axis and including:
an inner support member;
an outer support member spaced from and surrounding said inner support member;
at least one first elastomeric isolator ring between said inner and outer support members;
at least one second elastomeric isolator support ring between said inner and outer support members, said second isolator ring being axially spaced from said first isolator ring;
at least one opening through each of said first and second isolator rings to permit the passage of fluid therethrough;
a plurality of stacked spring elements between said first and second isolator rings;
first ring support means between said first elastomeric isolator ring and said stacked spring elements;
second ring support means between said second elastomeric isolator ring and said stacked spring elements; and
each of said first and second ring support means including at least one flow opening therein to permit the passage of fluid therethrough, wherein each of said spring elements comprises a conical disc spring.

16. The device of claim 15 wherein:
said spring elements are mounted on said inner support member.

17. The device of claim 16 including:
sleeve means mounted along said outer support member between said first and second ring support means.

18. The device of claim 15 wherein each of said conical disc springs have an interior surface and an exterior surface and wherein:
said conical disc springs are stacked such that adjacent pairs of springs have their interior surfaces in facing relationship.

19. The device of claim 15 wherein said first ring support means comprises:
a first support ring mounted on said inner support member and having at least one flow hole therein;
a second support ring mounted on said outer support member and having at least one flow hole therein; and
said first and second support rings being in abutting relationship.

20. The device of claim 15 wherein said second ring support means comprises:
a third support ring mounted on said inner support member and having at least one flow hole therein;

a fourth support ring mounted on said outer support member and having at least one flow hole therein; and said third and fourth support rings being in abutting relationship.

21. The device of claim 20 wherein said second ring support means comprises:

a third support ring mounted on said inner support member and having at least one flow hole therein;

a fourth support ring mounted on said outer support member and having at least one flow hole therein; and said third and fourth support rings being in abutting relationship.

22. The device of claim 21 including:

a plurality of spaced flow holes through each of said first, second, third and fourth support rings.

23. The device of claim 15 wherein:

at least one of said first and second elastomeric isolator rings is rigidly connected to both said inner and outer support members.

24. The device of claim 15 wherein:

each of said first and second elastomeric isolator rings have opposed sidewalls and including:

annular recesses along each of said sidewalls.

25. The device of claim 15 wherein each of said first and second elastomeric isolator rings have an inner and outer cylindrical surface and including:

a first metal ring on said inner cylindrical surface; and a second metal ring on said outer cylindrical surface.

26. The device of claim 15 including:

a plurality of spaced flow holes through each of said first and second ring support means.

27. The device of claim 15 including:

at least eight spaced flow holes through each of said first and second ring isolator support means.

* * * * *